UNITED STATES PATENT OFFICE.

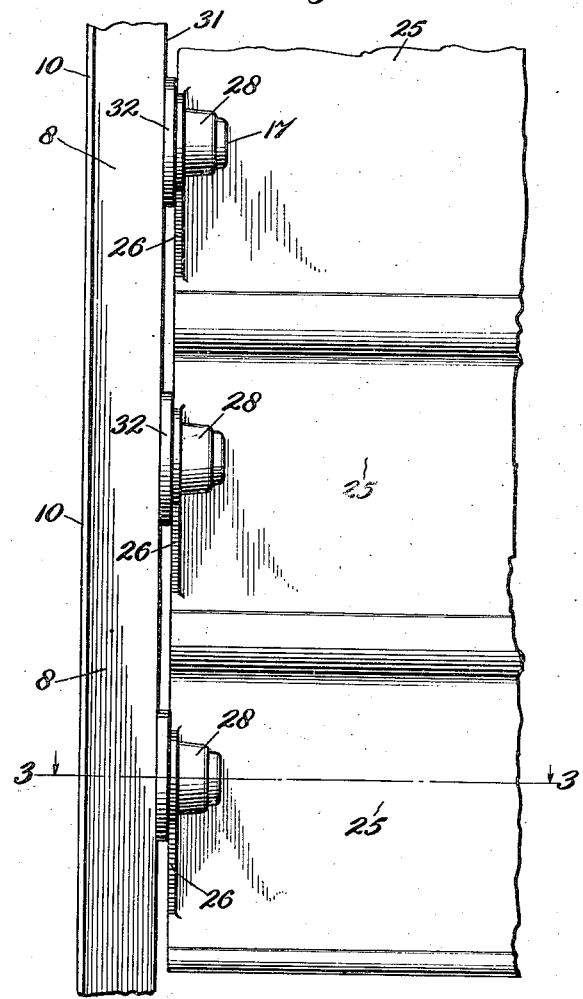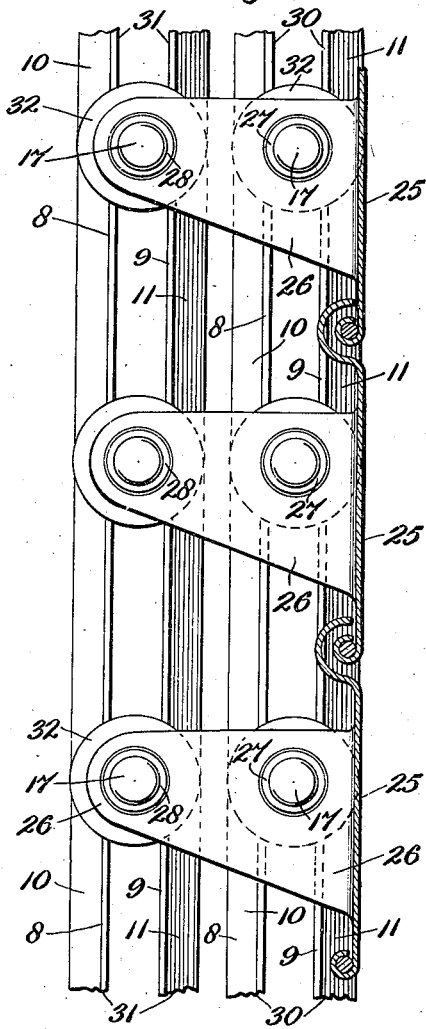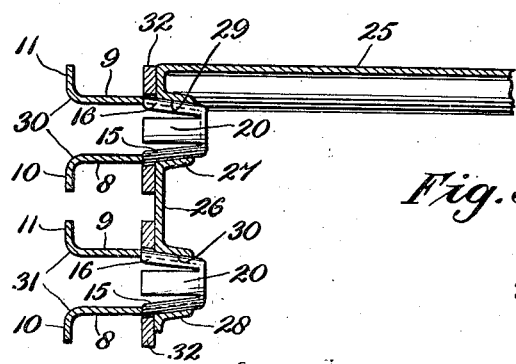

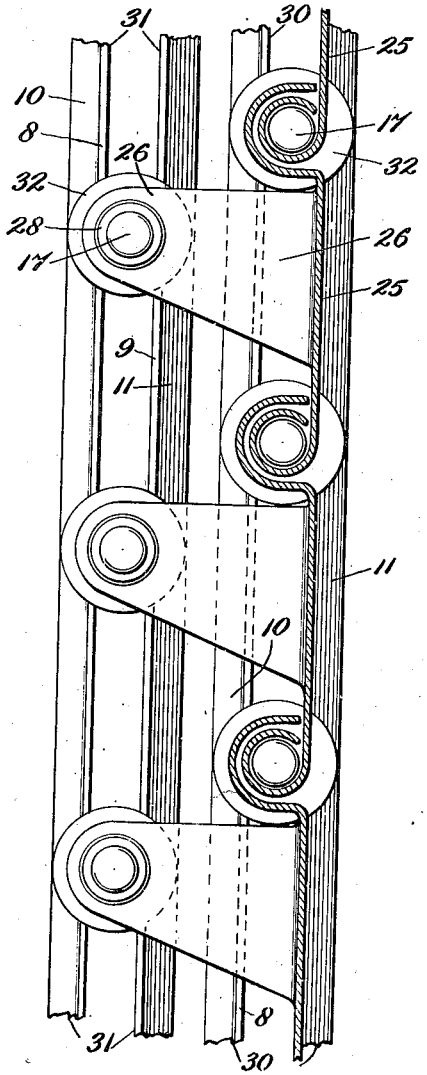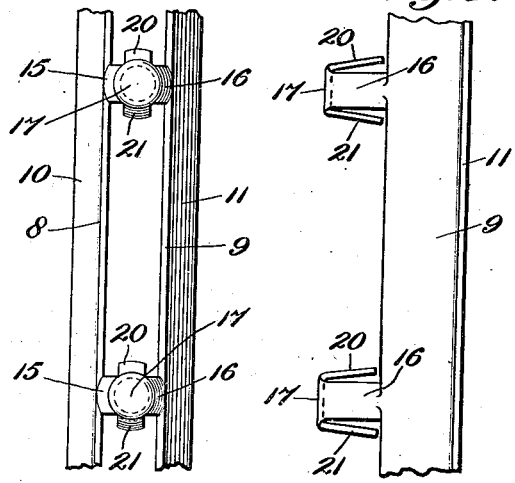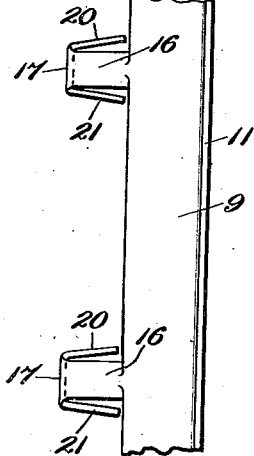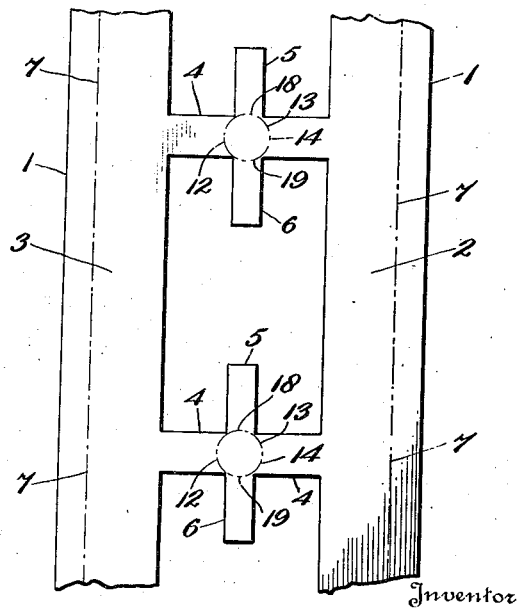

ARTHUR P. WOLFE, OF LOCKPORT, NEW YORK, ASSIGNOR TO HARRISON RADIATOR CORPORATION, A CORPORATION OF NEW YORK.

SUPPORTING AND ACTUATING MEANS FOR AUTOMOBILE RADIATOR SHUTTERS.

1,423,982.

Specification of Letters Patent.  Patented July 25, 1922.

Application filed March 28, 1921. Serial No. 456,310.

*To all whom it may concern:*

Be it known that I, ARTHUR P. WOLFE, a citizen of the United States, residing at Lockport, in the county of Niagara and State of New York, have invented certain new and useful Improvements in Supporting and Actuating Means for Automobile Radiator Shutters; and I do hereby declare the following to be a full, clear, and exact description of the invention, such as will enable others skilled in the art to which it appertains to make and use the same.

This invention relates to actuating and supporting means for automobile radiator shutters, and has for its object to produce a device of this character which will be simple in construction, comparatively inexpensive to manufacture, and more efficient in use than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1 is a diagrammatic, rear elevational view of a portion of an automobile radiator shutter, together with an actuating and supporting means made in accordance with the present invention;

Figure 2 is a diagrammatic vertical sectional view of the parts shown in Figure 1, as seen from the left of the said figure;

Figure 3 is a horizontal sectional view taken approximately on the line 3—3 of Figure 1;

Figure 4 is a side elevational view of a portion of one of the actuating members shown in Figures 1, 2, and 3;

Figure 5 is an elevational view of the parts shown in Figure 4 as seen at right angles to said figure, looking toward the left;

Figure 6 is a diagrammatic plan view of a portion of the blank from which the actuating and supporting members shown in Figures 4 and 5 are formed; and Figure 7 is a view similar to Figure 2 illustrating the present invention as applied to a slightly modified form of shutter.

In the past few years there has been a great increase in the use of automatic and manually actuated shutter members in connection with automobile radiators for the purpose of controlling the amount of air passing through the radiator and thereby in turn controlling the temperature of the cooling water circulating in the water jackets of the automobile engine. The blades of these shutters as constructed up to the present time have been more or less complicated by the use of turned trunnions fastened in the two ends of the shutter blades, which trunnions fit into drilled holes in a pair of oppositely disposed supporting bars held in the inside of the radiator shell. A movable or actuating bar for oscillating the shutters is mounted within the said shell and is provided with trunnions riveted into it, which trunnions co-act with cranks or ears which are in turn spot welded to the shutter blades. The riveting of these various trunnions necessitates hand work, with the result that the assembly of the blades as well as the mounting of the shutter in the shell has been a comparatively tedious and expensive proceeding.

In order to overcome these difficulties the present invention contemplates a supporting and actuating bar preferably stamped from sheet metal and having formed integral with it suitable bearing lugs or trunnions for supporting the shutter members, all as will more fully appear below.

Referring now to the drawings, 1 indicates a blank of sheet metal of suitable gauge which has been subjected to the action of dies or otherwise formed into substantially the shape shown in Figure 6. That is to say, the said blank comprises a pair of longitudinal side members 2 and 3 of suitable length, which members may be connected by the cross pieces 4 provided with the angularly disposed extensions 5 and 6, as will be readily apparent.

The blank shown in Figure 6 is next subjected to the action of suitable dies, which bend the same along the dotted lines 7 to form the side members 8 and 9 provided with the angular extensions 10 and 11 respectively. The integral cross members 4 are acted upon by the said dies to bend the same approximately along the portions 12 and 13 of the dotted circles 14 shown in Figure 6 so as to form two arcuate members 15 and 16 integral with the side members 8 and 9 and in substantially the same plane as said members. The said arcuate members 15 and 16 are connected together by a substantially circular portion 17, as will be readily apparent from Figure 4 and the extensions 5 and 6 which in the original blank were integral with the members 4 are bent downwardly along the portions 18 and 19 of the dotted circles 14 to form arcuate prongs or members 20 and 21, see Figures 4 and 5.

The action of these last mentioned forming dies upon the cross members 4 and the angularly disposed integral members 5 and 6 thereof is such as to form a somewhat tapered and hollow lug or boss having four legs or prongs 15, 16, 20 and 21, the first two of which are integral at their base with the side members 8 and 9, while the latter two of which are not attached at their lower portion to form spring members, for a purpose which will presently appear.

Referring now more particularly to Figures 1, 2, and 3, the shutter bar members which are adapted to co-act with the supporting members and actuating members which have just been described are indicated at 25 and are provided at their ends with the integral angular ears 26 each of which ears has been stamped or otherwise formed to provide a pair of tapered bosses 27 and 28, having the tapered openings 29 and 30 respectively. These said shutter bar members, as shown, may be constructed of sheet material of suitable gauge, and as will be readily appreciated, the entire process of forming the same may be carried out in automatic die pressing machinery with great rapidity and accuracy.

In assembling a radiator shutter of this type, a fixed and supporting pair 30 of the stamped members, illustrated in Figures 4 and 5 are suitably mounted within the shell of the radiator and the desired number of shutter members 25 is associated therewith, the hollow lugs 17 of the said supporting member 30 entering into the tapered holes 29 in the bosses 27 of the shutter ears 26, as will be clear from the drawings. In like manner, a pair of movable actuating members or bars 31, which are in all respects the same as the supporting bars 30, and as shown in Figures 4 and 5, are mounted with their hollow lugs or bosses engaging the tapered holes in the bosses 28 of the said shutter ears 26.

It will, of course, be understood that the pivots 17 of the supporting members 30 being rigidly secured within the shell of the radiator in any desired manner, they constitute fixed centers around which the shutter bars 25 turn. It will further be clear that the actuating bars 31 are connected either to a manually controlled means adapted to be operated from the dash of the automobile or to a suitable automatic thermostatic control, such as is customarily employed in this type of apparatus so that when said bars 31 are moved up and down the shutter bars will be opened and closed. Suitable washer members 32 may be interposed if desired between the supporting bar 30, the actuating bar 31, and the ears 26 of the shutters 25, as shown.

The type of shutter illustrated in Figures 1, 2, and 3, is what is commonly known as a balanced shutter, i. e., one in which the supporting pivot is substantially in the same horizontal plane as the actuating pivot, and also substantially midway between the top and bottom edges of the shutter blade. The construction illustrated in Figure 7 is substantially the same as that shown in Figures 1 and 2, except that in this instance the supporting pivots have been moved downwardly to the lower edge of the shutter blades and out of alinement with the actuating pivots, thereby providing what is commonly known in this art as an "unbalanced shutter".

As above described, the members 20 and 21 of the hollow lugs or pins are resilient, constituting spring members and it will be readily apparent that owing to the taper given both the said pins and to the holes 29 and 30 in the shutter bosses 27 and 28, that all lost motion and play between the supporting and actuating bars and the shutter members will be eliminated. Furthermore, by this construction, the necessity for accurate alinement of the supporting and actuating bars is done away with for if any of these said bars should be out of alinement with its companion bars the two spring members 20 and 21 of the hollow pins will yield and compensate for the error in alinement.

The operation of this automobile radiator shutter may be summarized as follows:— The individual shutter members 25 and angular ears 26 being pivoted by their bosses 27, see Figs. 2 and 3, which fit over the fixed pivots 17 carried by the fixed supporting member 30, it follows that any movement of the left hand ends of said ears 26, as seen in Figure 2, will rotate said shutter members 25 on said fixed pivots 17 as centers. And these left hand ends of the ears 26 being pivoted by their bosses 28 on the movable pivots 17 located to the left of said fixed pivots, as seen in Fig. 2, it is evident that any up and down movement of the actuating members 31 carrying said movable pivots 17 will turn said shutter members on said fixed pivots, to accomplish said rotation. That is to say, the actuating members 31, Fig. 2, may be moved up and down by any suitable and well known means (not shown) such as a thermostatic device, or other apparatus, and when this is done the bosses 27 of the shutter members 25 will turn on their fixed pivots 17 to open and shut positions.

It will thus be seen that an exceedingly inexpensive construction of shutter, supporting bar, and actuating bar is provided, that each of the said members may be formed of sheet material and that the forming action in each case may be carried out with great rapidity and efficiency by the use of suitable dies.

It is obvious that those skilled in the art may vary the details of construction, as well as the arrangement of parts, without departing from the spirit of the invention, and therefore, I do not wish to be limited to the above disclosure, except as may be required by the claims.

What I claim is:

1. In an automobile radiator shutter the combination of a fixed shutter bar supporting means comprising a pair of strips provided with an integral hollow pivot member; a movable shutter bar supporting means comprising a pair of strips provided with an integral hollow member; and a shutter bar provided with a pair of bosses adapted to fit said hollow members, substantially as described.

2. A pivoting support for automobile radiator shutters comprising a pair of sheet metal strips having integral therewith a plurality of hollow pivot members, substantially as described.

3. A supporting and actuating means for radiator shutters comprising an angle bar member formed from sheet material and provided with an integral hollow pivot boss having resilient portions, adapted to engage an opening in a portion of the shutter blade, substantially as described.

4. A supporting and actuating means for radiator shutters comprising an angle bar member formed from sheet material and provided with a rigid tapered hollow pivot boss having resilient portions, adapted to engage an opening in a portion of the shutter blade, substantially as described.

5. A pivoting means for use with automobile radiator shutters comprising a pair of angle bars having connected therewith a plurality of hollow pivot members adapted to engage openings in shutter bar members, substantially as described.

6. A supporting and actuating means for radiator shutters comprising a plurality of angle bar members connected together by a plurality of rigid tapered hollow pivot bosses having resilient portions adapted to engage openings in the shutter blades, substantially as described.

7. A supporting and actuating means for radiator shutters comprising a pair of angle bar members connected together by a plurality of integral tapered pivot bosses having resilient portions, adapted to engage openings in the shutter blades, the whole being formed from a single piece of sheet material, substantially as described.

8. A supporting and actuating means for radiator shutters comprising a pair of angle bar members, and a plurality of hollow pivot bosses, each having a resilient portion and a member integral with one leg of each of said angle members, the whole being formed from a single blank of sheet material, substantially as described.

9. In a shutter construction for radiators, the combination of a shutter member provided with an integral angularly disposed ear having an opening; a support to which said shutter member is pivoted; and means for oscillating said shutter member comprising an actuating bar member having an integral pivot boss engaging said opening, said bar member and boss being formed from a single blank of sheet material, substantially as described.

10. In a shutter construction for radiators, the combination of a shutter member provided with an integral angularly disposed ear having a pair of openings; a support comprising a rigid bar member having an integral hollow pivot boss engaging one of said openings; and means for oscillating said shutter member, comprising an actuating bar member having an integral hollow pivot boss engaging the other of said openings, said supporting and actuating bar members being each formed with their respective bosses from a single blank of sheet material, substantially as described.

In testimony whereof I affix my signature.

ARTHUR P. WOLFE.